United States Patent
Meah

(10) Patent No.: US 10,032,006 B2
(45) Date of Patent: Jul. 24, 2018

(54) COPYRIGHT GENERATION AND STORAGE UTILITY

(71) Applicant: John Meah, East Meadow, NY (US)

(72) Inventor: John Meah, East Meadow, NY (US)

( * ) Notice: Subject to any disclaimer, the term of this patent is extended or adjusted under 35 U.S.C. 154(b) by 0 days.

(21) Appl. No.: 15/206,054

(22) Filed: Jul. 8, 2016

(65) Prior Publication Data
US 2017/0011204 A1  Jan. 12, 2017

Related U.S. Application Data

(60) Provisional application No. 62/231,575, filed on Jul. 10, 2015, provisional application No. 62/386,320, filed on Nov. 27, 2015.

(51) Int. Cl.
| | | |
|---|---|---|
| *G11B 27/034* | (2006.01) | |
| *H04N 5/76* | (2006.01) | |
| *G06F 21/00* | (2013.01) | |
| *G06F 21/10* | (2013.01) | |

(52) U.S. Cl.
CPC ...... *G06F 21/10* (2013.01); *G06F 2221/0713* (2013.01)

(58) Field of Classification Search
None
See application file for complete search history.

(56) References Cited

U.S. PATENT DOCUMENTS

| | | | | |
|---|---|---|---|---|
| 2008/0066194 A1* | 3/2008 | Ketola | ................... | H04L 63/10 726/33 |
| 2008/0313084 A1* | 12/2008 | Socolofsky | ............ | G06Q 30/04 705/52 |
| 2010/0257350 A1* | 10/2010 | Matuchniak | ............ | G06F 21/10 713/150 |
| 2011/0099083 A1* | 4/2011 | Karpinsky | ............. | G06Q 30/06 705/26.25 |
| 2015/0262616 A1* | 9/2015 | Jaime | ................... | G11B 27/034 386/228 |

\* cited by examiner

*Primary Examiner* — Robert R Niquette
*Assistant Examiner* — Joeseph W. King
(74) *Attorney, Agent, or Firm* — Lyman Smith; Patent Service Associates, Inc.

(57) ABSTRACT

A utility, typically in the form of a software application, allows an author to record digital media, generate and associate and/or embed unique copyright data with the media, store the media and copyright data locally and remotely, and receive an electronic receipt containing the generated unique copyright data, providing verifiable copyright protection for original works of authorship. Typically, the software application can generate copyright information during the creation of the media. This copyright information can include, for example, a generated unique copyright identifier, author's information such as name and address, device identifier provided by the device as available, device type, and the like. Embodiments of the present invention enhances the author's ability to record media such as video and images by ensuring a verifiable and unique copyright identifier is included with the digital content.

8 Claims, 3 Drawing Sheets

COPYRIGHT GENERATION AND STORAGE UTILITY

CROSS-REFERENCE TO RELATED APPLICATIONS

This application claims the benefit of priority to U.S. provisional patent application No. 62/231,575, filed Jul. 10, 2015 and to U.S. provisional patent application No. 62/386,320, filed Nov. 27, 2015, the contents of each of which are herein incorporated by reference.

BACKGROUND OF THE INVENTION

1. Field of the Invention

One or more embodiments of the invention relates generally to copyright solutions. More particularly, the invention relates to systems and methods for generating copyright information during the creation of media by running a software application on the copyright material generation device, such as a digital camera, video recorder, smart phone, or the like, while a photo, video, recording, or other copyright protectable media is generated.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

In the marketplace today, digital content is being produced at an exponential rate and these media are typically created without copyright data to specify identifiable information about the author. This leave the author at risk for copyright infringement.

Digital images, videos and audio recordings are generated by individuals and professionals at an incredible rate. For example, Facebook revealed in a white paper from 2013 that its users have uploaded more than 250 billion photos, and are uploading 350 million new photos each day. These photos can be easily shared, copied and transmitted without the knowledge or consent of the creator of the original works of art.

Professionally, many people rely on digital content for business. Professional photographers, videographers and advertising content developers are just among the few professions that may create original works of art that could end up being copied or distributed without the owner's knowledge or consent.

In view of the foregoing, it is clear that there is a need for a system and method for generating unique copyright information to embed into digital content and storing this information centrally for authentication.

SUMMARY OF THE INVENTION

Embodiments of the present invention provide a method for providing copyright protection to digital media comprising recording the digital media on a device; receiving, from a server, a unique identifier; associating the unique identifier with the digital media, immediately after the step of recording the digital media, via at least one of writing the unique identifier to metadata of the digital media and inscribing the unique identifier within the digital media to form a unique identifier associated digital media; electronically sending the unique identifier associated digital media to the server; and storing the unique identifier associated digital media and identification data to a storage medium.

Embodiments of the present invention further provide a method for providing copyright protection to digital media comprising recording the digital media on a device; displaying a copyright overlay over the digital media when viewed on the device; electronically sending the digital media to a server after recording; deleting the digital media from the device after electronically sending; associating a unique identifier with the digital media via at least one of writing the unique identifier to metadata of the digital media and inscribing the unique identifier within the digital media to form a unique identifier associated digital media; electronically sending the unique identifier associated digital media to the user; and storing the unique identifier associated digital media and identification data to a storage medium.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
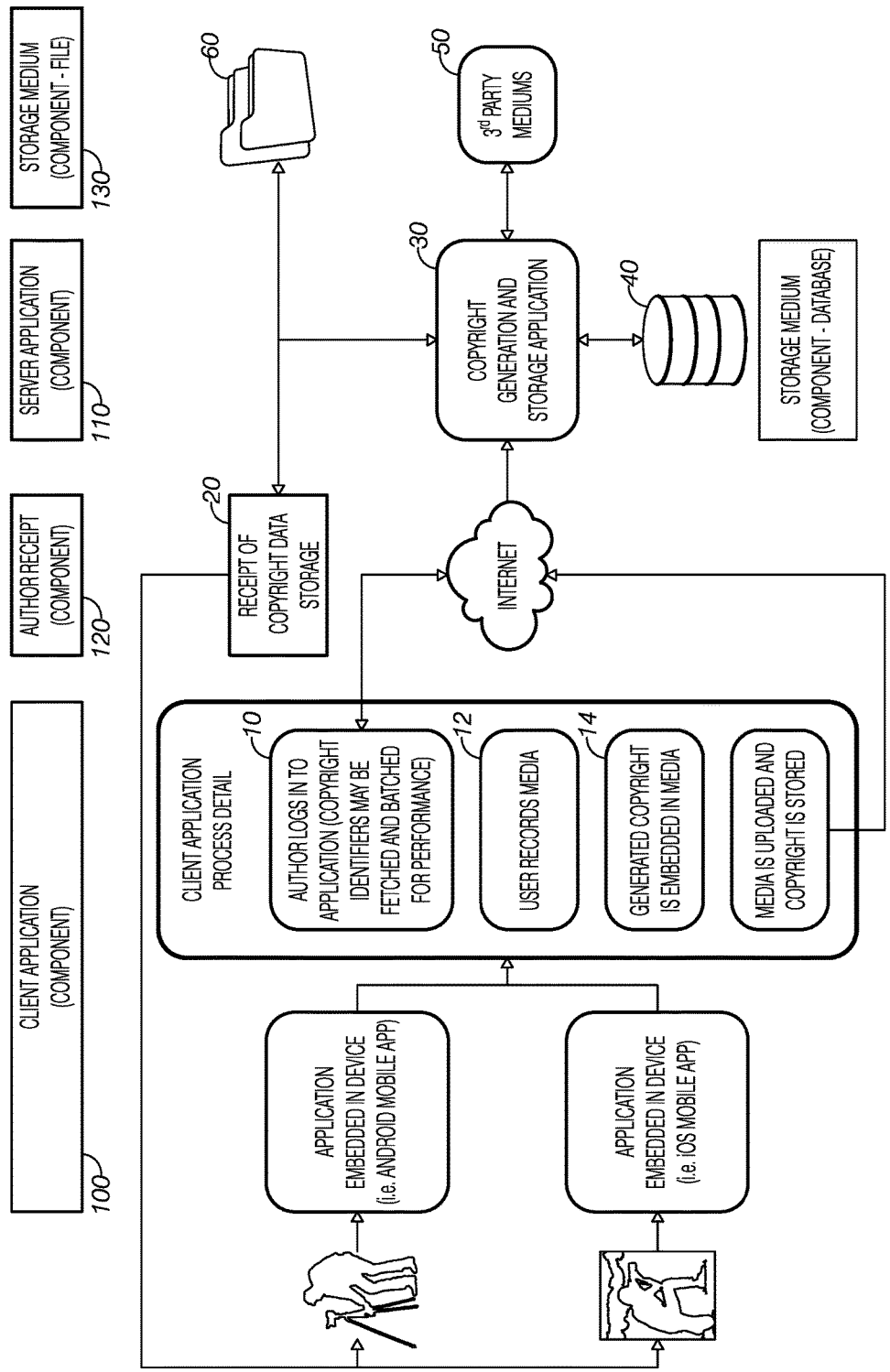
FIG. 1 illustrates a flow chart describing an exemplary embodiment of a copyright generation and storage utility according to the present invention.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary, a variety of optional components are described to illustrate the wide variety of possible embodiments of the present invention.

A "computer" or "computing device" may refer to one or more apparatus and/or one or more systems that are capable of accepting a structured input, processing the structured input according to prescribed rules, and producing results of the processing as output. Examples of a computer or computing device may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; a digital video recorder; a digital audio recorder; a digital camera; application-specific hardware to emulate a computer and/or software, such as, for example, a digital signal processor (DSP), a field programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

A "copyright generation device" may refer to any computing device capable of generating material that may be protectable under copyright laws. Thus, the term "computing device" includes any such "copyright generation device".

"Software" or "application" may refer to prescribed rules to operate a computer. Examples of software or applications may include: code segments in one or more computer-readable languages; graphical and or/textual instructions; applets; pre-compiled code; interpreted code; compiled code; and computer programs.

As used herein, the term "metadata" refers to inscribing or embedding data into a digital media file in any manner.

As used herein, the term "server" as it relates to sending and receiving copyright information, including copyright unique identifiers, for example, refers to any computing device that may be able to send and receive information on various types of networks. These networks can include, in addition to those discussed in greater detail below, peer to peer networks, the internet, Bluetooth® and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Python, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code may also be distributed among a plurality of computational units wherein each unit processes a portion of the total computation.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Web sites comprise a collection of connected, or otherwise related, webpages. The combination of all the web sites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASHEEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

As used herein, the "client-side" application should be broadly construed to refer to an application, a page associated with that application, or some other resource or function invoked by a client-side request to the application.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory or may be communicated to an external device so as to cause physical changes or actuation of the external device.

Broadly, embodiments of the present invention provide a utility, typically in the form of a software application, that allows an author to record digital media, generate and associate and/or embed unique copyright data with the media, store the media and copyright data locally and remotely, and receive an electronic receipt containing the generated unique copyright data, providing verifiable copyright protection for original works of authorship. Typically, the software application can generate copyright information during the creation of the media. This copyright information can include, for example, a generated unique copyright identifier, author's information such as name and address, device identifier provided by the device as available, device type, and the like. Embodiments of the present invention enhances the author's ability to record media such as video and images by ensuring a verifiable and unique copyright identifier is included with the digital content. In some embodiments, the system of the present invention can embed a unique copyright identifier in a live audio and/or video stream. In a video stream, for example, the system may embed the copyright identifier in a single frame thereof.

In some embodiments, the software may be downloaded to a device as a separate software application. In other embodiments, the software may be encompassed directly within hardware or memory of the device itself, without the need to install a separate software application onto the device. As used herein, reference to the "software application" may cover both downloaded or resident programming code configured to perform the described functions.

Embodiments of the present invention provide unique copyright data to the authors of digital media by authenticating the author and/or device, generating this data, and associating and/or embedding the data with the media during the recording process. Once the recording is complete, the media, with the unique data, is transmitted to the Server Application which constitutes "original works of authorship". Thus, the generated data affords the author with unique and verifiable data for copyright protection. A receipt is then generated and transmitted to the author as confirmation. The receipt may also, optionally, be stored as a file in a storage medium, as described below, for redundancy.

In order to use the invention, the author would download the software application and register for usage thereof. This process would create an account for the author. In some embodiments, this step can include validating the author's identity via integration with 3rd parties such as, but not limited to, credit card payment and/or credit/background check providers. Once registered, the author can then log in to the application by providing authentication data such as a username and password.

Upon authentication, the author can record media. Typically, the author can record media as usual, via the user's device (copyright material generation device, such as a smart phone). In some embodiments, media can be recorded via the software application. Regardless of manner of recordation, the software application functions as described below. In some embodiments, the software application, upon authentication, can download a predetermined number of unique identifiers, referred to as pre-fetched identifiers because they are not yet associated with any media.

At this point, the application can either use a pre-fetched unique identifier, or retrieve a unique identifier via transmission mechanism, that will be associated with the media such that the author's claim for copyright is verifiable by such activity. Further, security measures, such as, but not limited to, encryption and/or file integrity may be applied to the digital media.

Once the recording process has concluded, the media can be transmitted, via transfer mechanism such as, but not limited to, internet transfer (i.e. hypertext transfer protocol (secure)—http(s)), MMS transfer, email transfer (SMTP), or the like. The media, with unique copyright data stored, is written to one or more storage mechanisms—for example, a database and/or file server. Lastly, the user can receive a receipt, for example—an email, confirming the reception and storage of the media and copyright information. If the copyright unique identifier cannot be applied on the client, the media is transmitted, deleted locally, modified on the Server Application, and made available for download. This helps ensure a single copyrighted version exists.

In some embodiments, a user may wish to apply a copyright unique identifier to previously obtained media. In this embodiment, the user may flag the file for upload to the server application for modification and inclusion of the unique identifier. As described above, the application may delete the original version and provide the user with a method to download the modified media file, which includes the copyright unique identifier. In some embodiments, the user may be required to submit information to ensure the file they are claiming copyright belongs to them. This may include, for example, examination of metadata to ensure the origination device identification matches that authenticated as being the user's device.

Embodiments of the present invention are distinguished from existing products in the marketplace in that a specific copyright identifier is created for the media, associated with the media as described above, is specific to the device, and stored in a storage medium once recording is complete, which verifies the integrity of the media, the device the media was recorded on, and copyright unique data. Further, security measures such as, but not limited to, encryption and/or file integrity may be added to protect the author's claim to copyright and/or personal identifiable information. Lastly, a confirmation, documenting relevant data in a read only format (i.e., email with secure link to pdf download), is sent to the author, providing documentation of "original works of authorship".

Examples of products that can use this invention include, but are not limited to, photo and video recording instruments, content oriented websites and smartphone applications. Embodiments of the present invention may aid countless authors in protecting their work from copyright infringement.

Figure 2:
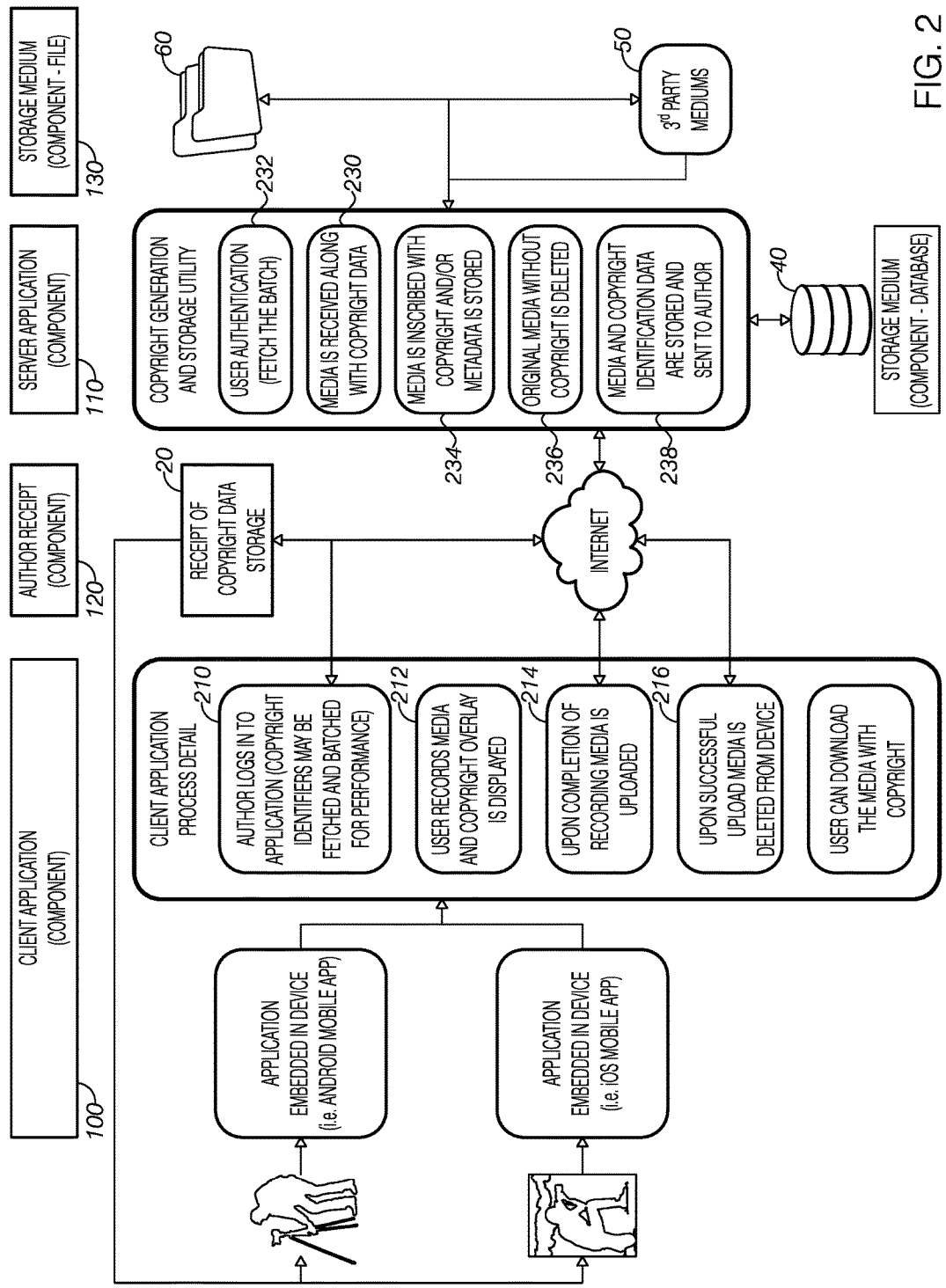
FIG. 2 illustrates a flow chart describing an exemplary embodiment of a copyright generation and storage utility according to the present invention.

Several components are used to provide the author of digital media the ability to generate and store unique copyright data as part of media creation. The relationship between the components is such that, by generating the copyright data as part of the recording process and associating, and/or embedding, this data with the media, the author now has unique copyright identifiable information. As shown in FIGS. 1 and 2, the components that enable this capability are as follows:

1. A Client Application component 100 installed on the recording device that can generate and/or retrieve the copyright identification data, associate and/or embed this data within the media as part of the recording process, and transmit the media along with the generated copyright data upon recording completion;

2. A Server Application component 110 to generate copyright unique identification data for the media. Additional security measures can be added such as, but not limited to, encryption of the media and any adjoining data (i.e., encryption keys). The Server Application can receive the media with embedded copyright data for the medium;

3. Storage Medium(s) 40, 60 (including file storage component 130) to store the media and associated unique copyright data; and 4. An Author Receipt component 120 to provide the author with a confirmation data of the copyright. This receipt may be stored as a file in a storage medium as an additional means of redundancy but is not requisite to complete the process.

Referring now to FIG. 1, a flowchart describing a copyright generation and storage utility system and method is shown.

At step 10, the author can log in to the application via a transmission mechanism for authentication (i.e., html form with username and password transmitted via https). The author's identity can be validated, for example, against any necessary 3rd party mediums 50 such as, but not limited to credit card, debit card, and/or background check service providers. Verification of identity may take place as part of registration or purchase medium (i.e., subscription payments) for the application. In addition, copyright identifiers may be fetched and batched for use, specific to the device via a device identifier (also referred to as the batch).

In step 12, the author can initiate recording of media such as, but not limited to, video, and images. A unique identifier for the copyright is generated and/or fetched from the batch as noted above. The identifier is stored in the storage medium 40. This step is not necessary if the copyright is retrieved from the batch as the batch is device specific and is typically stored on the device itself. The identifier is transmitted back to the application and author. This step is not necessary if the fetch of copyright identifiers took place prior, as noted above. In step 14, the copyright identifier is associated with the media via the media's metadata and/or inscribed within the media post recording. This can be accomplished in various manners.

In step 14, the media is then transmitted from the device. This may be accomplished in various manners, such as via an internet transmission, as shown. Of course, other methods for transmission may be used within the scope of the present invention, such as MMS, email, or the like. In some embodiments, the software application may include compression algorithms to compress the data into a smaller file size footprint. In some embodiments, the user's device may wait until a wireless internet connection is available before transmission. In some embodiments, the user's device may transmit the data to a local, intermediate server, which may then send the digital media to the server application. Such a configuration may be useful in a photo studio, where the user's device may be connected in a local network to the intermediate server.

In step 30, media and identification data are received by the server application. The server application stores media and identification data in a file storage component 60.

In some embodiments, in step 20, a receipt is transmitted to the account owner/author as an added level of security. This step, however, is not required to fulfill the process. The receipt may also, optionally, be stored in the file storage component 60 for redundancy and as an added level of security.

In order to build this application as outlined in FIG. 1, the developer will need to build the following components (note: the technologies listed should be viewed as sample in nature given the rapid change of technology but the design would remain viable using other existing and/or future technology (i.e., new API from Apple):

1. Client Application Component (i.e., iOS and/or Android app)
    a. Registration/Login capabilities typically via forms of web services
        i. Ref. http://www.ibm.com/developerworks/library/ws-restful/
    b. Ability to receive and store one or more unique identifiers for recording purposes. These identifiers can be generated on the server side and sent via, for example, https to the device. Examples of this can be readily found via web search.
    c. Ability to generate to associate copyright data as metadata in the media.
        i. For video on iOS this involves using the AVMutableMetaDataItem class from the AV Foundation Framework to add the copyright metadata or sub-classing this class (ref. https://developer.apple.com/library/ios/documentation/AudioVideo/Conceptual/AVFoundationPG/Articles/04_MediaCapture.html)
        ii. For images on iOS this involves using the CMCopyDictionaryOfAttachments (ref. https://developer.apple.com/library/mac/documentation/CoreMedia/Reference/CMAttachment/#//apple_ref/c/func/CMCopyDictionaryOfAttachments) class generating a string of the copyright attributes, storing this string within the comments section of the EXIF data and saving the metadata back to the image using the CGImageDestinationAddImageFromSource class (ref. https://developer.apple.com/library/mac/documentation/GraphicsImaging/Reference/CGImageDestination/#//apple_ref/c/func/CGImageDestinationAddImageFromSource).
    d. Once the recording is complete the media can be transmitted using existing transfer mechanisms using known methods such as html form post, TCP based transmission, or 3rd party SDKs for cloud based file transfer such as Amazon Web Services S3 APIs.
        i. Ref. http browser based—https://developers.google.com/youtube/2.0/developers_guide_protocol_browser_based_uploading
        ii. Ref. iOS http://docs.aws.amazon.com/mobile/sdkforios/developerguide/s3transfermanager.html
        iii. Ref: Android http://docs.aws.amazon.com/mobile/sdkforandroid/developerguide/s3transfermanager.html#
    e. Once the transmission is complete a web service may be used to finalize the transaction and store the information in the storage medium(s)—examples of this can be readily found via web search.

2. Server Application Component (i.e., Web Server based PHP application with capabilities to integrated via web services to 3rd parties). There are numerous ways to determine how to architect the necessary web service methods for the server side component so below is a sample listing of what can be used to implement the design in abstract fashion as the coding is widely known and well documented on the web.
    a. User Registration—web service that will accept an https request containing relevant registration information such as, but not limited to, username, password, name and address.
    b. User Login—web service that will accept an https request containing relevant login information and authenticates the author via username and password though other means may be implemented.
    c. Fetch Copyright Identifier—web service that will accept an https request to generate one or more unique identifiers using a variation of industry utilized universal unique identifier (Ref. https://en.wikipedia.org/wiki/Universally_unique identifier) and send this identifier back to the client. In addition, cryptographic algorithms such as MD5 or SHA256 may be used to strengthen the identification data.

d. Finalize Media and Store Copyright—web service that will accept an https request to receive and store identification information for the media and copyright relevant data. The media and data can then be housed as required by the developer (i.e. in a file server and/or database) as deemed necessary by the usage of the application.

e. Verify Author—web service that could be used in conjunction with User Registration that enables a monthly payment plan with associated credit card to identify the user by name and address and/or perform an online background check with third party service providers as necessary. This verification is optional. For example, such verification may not be necessary when the user is using their own device and such device can be identified and included with the copyright which, through the device identification, provides verification of the author.

3. Storage Medium (database) Component—There are numerous ways to determine how to architect the necessary table(s) for the database component so below is a sample listing of what may be used in abstract fashion as the coding is widely known and well documented on the web.

a. User—table to house the user's registration information.

b. Media—table to house the media's information and generated copyright data.

4. Storage Medium (file) Component a. Media—the original media should be housed in File Storage and may be encrypted. An example of this would be Amazon Web Service S3 which provides file storage and optional encryption (Ref http://docs.aws.amazon.com/AmazonS3/latest/dev/UsingServerSideEncryption.html)

b. Author receipt—as an added level of redundancy the receipt sent to the author can be housed within file storage but this is not a requirement for the process.

5. Author Receipt—There are numerous ways to transmit a confirmation receipt the most common of which is to send an email receipt. Further, to add security a link to a secure url can be provided.

Once the coding is complete and the application is functional, the client side application would be deployed to existing stores for sale or free download from services such as, but not limited to, Apple's App Store or Android's Play Store.

Referring to FIG. 2, in step 210, the author logs in to the application via transmission mechanism for authentication (i.e., html form with username and password transmitted via https). In step 232, the author's identity may be validated against the storage mechanism and any necessary 3rd party mediums 50 such as, but not limited to credit card, debit card, and/or background check service providers. Verification of identity may take place as part of registration or purchase medium (i.e., subscription payments) for the Application. In addition, copyright identifiers may be fetched and batched for use, specific to the device via a device identifier (also referred to as the batch).

In step 212, the author can then initiate recording of media such as, but not limited to, video, and images. A unique identifier for the copyright is generated and or fetched from the batch noted above. The identifier may be stored in the storage medium 40. This step is not necessary if the copyright is retrieved from the batch as the batch is device specific. The identifier may be transmitted back to the application and author. This step is not necessary if the fetch of copyright identifiers took place prior as noted above. The copyright identifier is displayed as an overlay on the recording.

In step 214, the media is then transmitted from the device. Once successfully transmitted, in step 216, the media is deleted from the device to ensure that no non-copyright identified media is present.

In step 234, the copyright identifier is associated with the media via the media's metadata and/or inscribed within the media recording. In step 236, once the media holds the copyright identification data the original media is deleted. Then, in step 238, media and identification data are stored in the storage medium.

In step 20, a receipt is transmitted to the account owner/author as an added level of security but is not required to fulfill the process. The receipt may also be stored in file storage medium 60 for redundancy and as an added level of security but is not required to fulfill the process.

Finally, in step 218, the user can download the media with the copyright unique identifier present therein.

Similar to the embodiment describe above with respect to FIG. 1, the embodiment of the present invention of FIG. 2, include components to provide the author of digital media the ability to generate and store unique copyright data as part of media creation. The relationship between the components is such that by generating the copyright data as part of the recording process and associating, and/or embedding, this data with the media the author now has unique copyright identifiable information. The components that enable this capability are:

1. A Client Application 100 installed on the recording device that can generate and/or retrieve the copyright identification data, associate and/or embed portions of this data within the media as part of the recording process, transmit the media along with the generated copyright data upon recording completion. Once the media is uploaded the local media is deleted since it may not contain the copyright unique identifiers and/or inscribed copyright.

2. A Server Application 110 to generate copyright unique identification data for the media. Additional security measures can be added such as, but not limited to, encryption of the media and any adjoining data (i.e., encryption keys). The Server Application can receive the media with partial embedded copyright data for the medium. In this case partial data is received so the media is modified by the server to add the copyright data, the original media is deleted, and the media with the copyright is made available for download.

3. Storage Medium(s) 40, 60 (including file storage component 130) to store the media and associated unique copyright data.

4. Author Receipt 20 to provide the author with a confirmation data of the copyright. This receipt may be stored as a file in a storage medium as an additional means of redundancy but is not requisite to complete the process.

Similar to the embodiment describe above with respect to FIG. 1, the embodiment of the present invention of FIG. 2, provides unique copyright data to the authors of digital media by authenticating the author and/or device, generating this data, and associating and/or embedding partial data with the media during the recording process. Once the recording is complete the media is uploaded, then deleted locally. The Server Application then modifies the received media to store all of the copyright unique data and deletes the media received. This ensures there is one copy of the media and it houses the copyright which constitutes "original works of authorship" and thus the generated data affords the author with unique and verifiable data for copyright protection. The media is made available for download to the author and a receipt is then generated and transmitted to the author as confirmation. The receipt may also be stored as a file in a storage medium for redundancy but this is not a requisite to complete the process.

In order to build this application as outlined in FIG. 2, the developer will need to build the following components (note: the technologies listed should be viewed as sample in nature given the rapid change of technology but the design would remain viable using other existing and/or future technology (i.e. new API from Apple):

1. Client Application Component (i.e. iOS and/or Android app)
 a. Registration/Login capabilities typically via forms of web services
  i. Ref. http://www.ibm.com/developerworks/library/ws-restful/
 b. Ability to receive and store one or more unique identifiers for recording purposes. These identifiers can be generated server side and sent via http to the device.—examples of this can be readily found via web search.
 c. Ability to generate to associate copyright data as metadata in the media.
  i. For video or images on Android, metadata can be stored. This involves using the MediaMetadataRetriever class and the copyright metadata is put in the MediaStore.Video.Media.TAGS table (ref. http://developer.android.com/reference/android/media/MediaMetadataRetriever.html).
 d. Once the recording is complete the media can be transmitted using existing transfer mechanisms using known methods such as html form post, TCP based transmission, or 3rd party SDKs for cloud based file transfer such as Amazon Web Services S3.
  i. Ref. http browser based—https://developers.google.com/youtube/2.0/developers_guide_protocol_browser_based_uploading
  ii. Ref. iOS http://docs.aws.amazon.com/mobile/sdkforios/developerguide/s3transfermanager.html
  iii. Ref: Android http://docs.aws.amazon.com/mobile/sdkforandroid/developerguide/s3transfermanager.html#.
 e. Once the transmission is complete the local media is deleted and the Server Application resumes the process as noted below.

2. Server Application Component (i.e., Web Server based PHP application with capabilities to integrated via web services to 3rd parties). There are numerous ways to determine how to architect the necessary web service methods for the server side component so below is a sample listing of what can be used to implement the design in abstract fashion as the coding is widely known and well documented on the web.
 a. User Registration—web service that will accept an https request containing relevant registration information.
 b. User Login—web service that will accept an https request containing relevant login information and authenticates the author via username and password though other means may be implemented.
 c. Fetch Copyright Identifier—web service that will accept an https request to generate one or more unique identifiers using a variation of industry utilized universal unique identifier (Ref. https://en.wikipedia.org/wiki/Universally_unique_identifier) and send this identifier back to the client. In addition, cryptographic algorithms such as MD5 or SHA256 may be used to strengthen the identification data.
 d. Finalize Media and Store Copyright—web service that will accept an https request to receive and store identification information for the media and copyright relevant data. Once the media is received the copyright is applied using transcoding software such as—http://www.ffmpeg.org, the received media is deleted, and the copyrighted media is made available for download. The data is recorded in the storage medium and a receipt is sent to the end user. The data can then be house as required by the developer (i.e., in a media table with a metadata column or in multiple tables) as deemed necessary by the usage of the application.
 e. Verify Author—web service that could be used in conjunction with User Registration that enables a monthly payment plan with associated credit card to identify the user by name and address and/or perform an online background check with third party service providers as necessary. This verification is optional. For example, such verification may not be necessary when the user is using their own device and such device can be identified and included with the copyright which, through the device identification, provides verification of the author.

3. Storage Medium (database) Component—There are numerous ways to determine how to architect the necessary table(s) for the database component so below is a sample listing of what may be used in abstract fashion as the coding is widely known and well documented on the web.
 a. User—table to house the user's registration information
 b. Media—table to house the media's information and generated copyright data 4. Storage Medium (file) Component
 a. Media—the original media should be housed in File Storage and may be encrypted. An example of this would be Amazon Web Service S3 which provides file storage and optional encryption (Ref. http://docs.aws.amazon.com/AmazonS3/latest/dev/UsingServerSideEncryption.html).
 b. Author receipt—as an added level of redundancy the receipt sent to the author can be housed within file storage but this is not a requirement for the process.

5. Author Receipt—There are numerous ways to transmit a confirmation receipt the most common of which is to send an email receipt. Further, to add security a link to a secure url can be provided.

Once the coding is complete and the application is functional the client side application would be deployed to existing stores for sale or free download from services such as, but not limited to, Apple's App Store or Android's Play Store.

For both embodiments, the use of the invention may be achieved, for one example, as outlined below.

First, as described above, the user would download and install the application (i.e., from the Google Play Store or Apple App Store). Next, the user would register as a user or login if the author has an existing account. As discussed above, the application can provide a touch ability, or other means, to initiate recording of user media such as video, audio, or still images similar to existing smartphone cameras such as, but not limited to, Apple's iPhone. Additional usability means to initiate recording may be introduced by manufacturers going forward but should not change the underlying application of the invention. In some embodiments, the application can run in the background as the user uses the devices own built-in photo, video or recording capabilities.

Once complete use a touch enabled capability can be used to finalize the recording. Additional means to finalize recording may be introduced by manufacturers going forward. In some embodiments, the device's own mechanism to finalize the recording may be utilized.

At this point the media is transmitted, stored, and the author receives a confirmation receipt via email, which constitutes "original works of authorship" and thus copyright protection.

An author can use this invention across a range of media recording devices. By utilizing the application, the author can generate copyright data that can be used to protect the author's rights.

Figure 3:
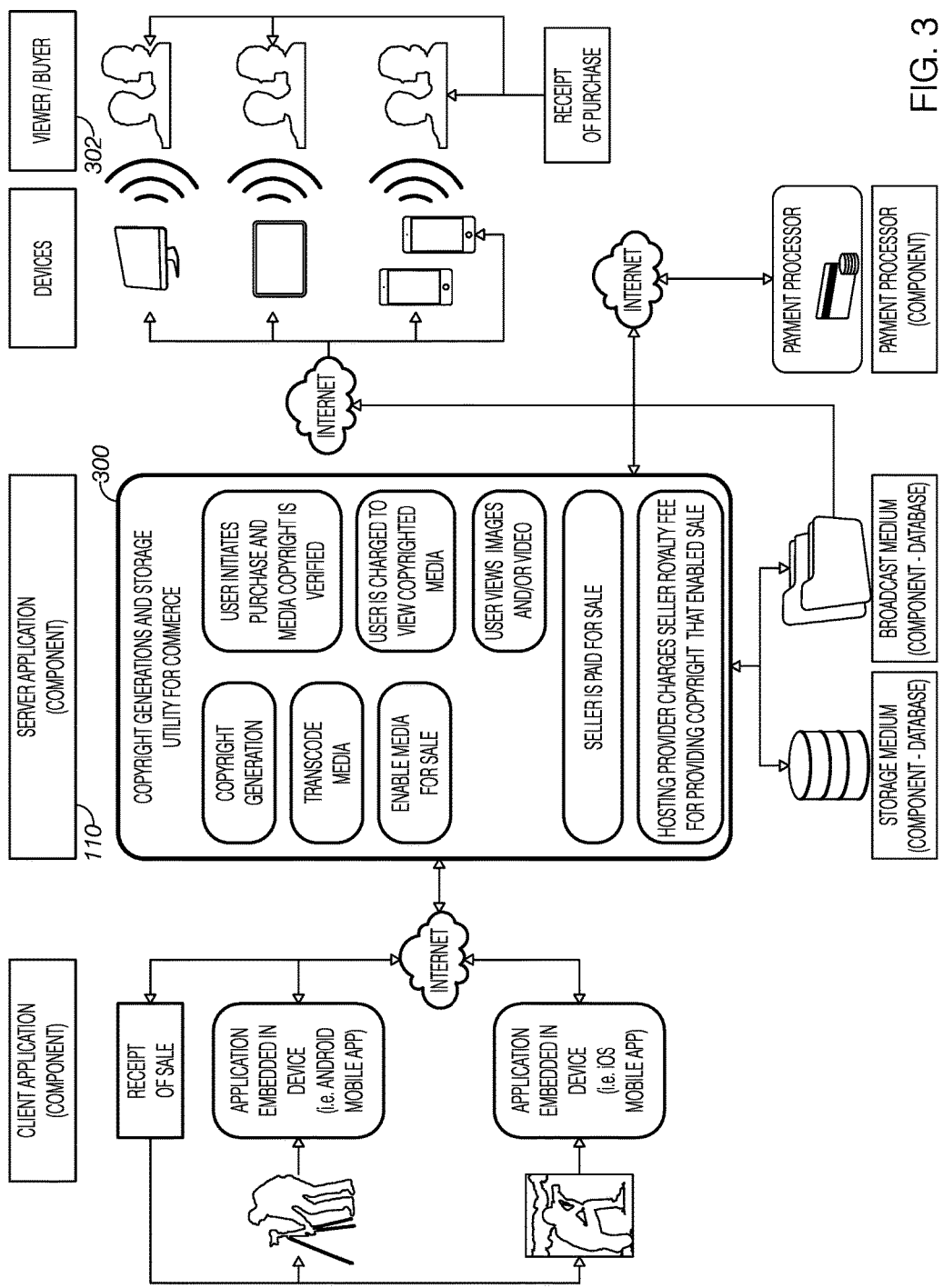
FIG. 3 illustrates a flow chart describing an exemplary embodiment of a copyright generation and storage utility useful for commerce and electronic delivery of media.

Referring to FIG. 3, the digital media file may receive the copyright unique identifier, as described above with respect to either FIG. 1 or FIG. 2. However, in this embodiment, the server application 110 can include additional functionality 300 to provide a commerce feature.

These additional functionalities can include steps to enable the media for sale, such as providing the media to others for viewing. The user 302 may be charged for this viewing or the initial viewing may be provided at no charge. The user 302 may view the digital media on various computing devices 304, some of which are shown in FIG. 3. If the user likes what they see or hear, the user can initiate a purchase of the digital media. The server application can charge the buyer, send payment to the seller and retain a portion of the sale as a service fee for facilitating the sale. Of course, other payment arrangements between the buyer, seller and server application can be arranged depending on convention, the particular market, seller or buyer requirements, or the like.

The commerce system of FIG. 3 can provide users the ability to offer their copyright protected (by the embedded unique identifier, for example) material for sale to others. The server application may include various search features, categories, and the like, to allow the potential buyers the ability to find the desired content. For example, if the buyer owns a company called "twin pines" and is looking for a photo of two pine trees, they may be able search, via the server application, for an appropriate photo and purchase rights to use the photo. As another example, a news outlet may desire a video of a particular incident or location. They may be able to use the commerce portion of the present invention to search and purchase rights in the desired video clip, with the knowledge that such clip is theirs to use without worry of violating another's copyright.

While the Figures show a box labelled "internet", it should be understood that various transfer protocols may be used to transfer data, files, and the like.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A method for providing copyright protection to digital media, comprising:
   recording digital media on a device by a user;
   displaying the recorded digital media having a copyright overlay, on the device;
   electronically sending the digital media to a server after recording;
   deleting the digital media from the device after electronically sending the digital media to the server after recording;
   associating, at the server, a unique identifier with the digital media, via at least one of writing the unique identifier to metadata of the digital media and inscribing the unique identifier within the digital media, to form a unique identifier associated digital media;
   electronically sending the unique identifier associated digital media to the user; and
   storing the unique identifier associated digital media and identification data to a storage medium.

2. The method of claim 1, wherein the step of electronically sending the unique identifier associated digital media to the user includes sending a message to the user permitting download of the unique identifier associated digital media.

3. The method of claim 1, further comprising running a software application on the device, the software application controlling the receiving, the associating and the electronically sending steps.

4. The method of claim 1, further comprising sending a receipt to the user verifying storage of copyright data.

5. The method of claim 4, further comprising storing the receipt in the storage medium.

6. The method of claim 3, further comprising authenticating the user with the software application.

7. The method of claim 1, further comprising offering the unique identifier associated digital media for sale.

8. The method of claim 7, further providing receiving payment from a purchaser, sending the unique identifier associated digital media to the purchaser, sending at least a portion of the payment to the user.

\* \* \* \* \*